(12) United States Patent
Ohinata et al.

(10) Patent No.: US 6,198,583 B1
(45) Date of Patent: Mar. 6, 2001

(54) MAGNETIC RECORDING CONTROL SYSTEM FOR DISK STORAGE DRIVE

(75) Inventors: Yusuke Ohinata; Kazuhito Shimomura; Akihiro Kimura; Yoshio Horiguchi, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/141,662

(22) Filed: Aug. 28, 1998

(30) Foreign Application Priority Data

Sep. 4, 1997 (JP) .................................................. 9-239600
Jun. 30, 1998 (JP) ................................................ 10-184311

(51) Int. Cl.[7] ................................. G11B 5/09; G11B 5/02
(52) U.S. Cl. ................................................. 360/46; 360/68
(58) Field of Search ..................................... 360/45, 46, 68

(56) References Cited

U.S. PATENT DOCUMENTS

| 4,821,125 | * | 4/1989 | Christensen et al. | 360/46 |
|---|---|---|---|---|
| 5,025,327 | * | 6/1991 | Stamness et al. | 360/45 |
| 5,172,280 | * | 12/1992 | Quintus et al. | 360/31 |
| 5,216,553 | * | 6/1993 | Nakamura | 360/68 |
| 5,408,365 | * | 4/1995 | Van Doorn et al. | 360/46 |
| 5,488,518 | * | 1/1996 | Shier | 360/67 |
| 5,687,036 | * | 11/1997 | Kassab | 360/53 |

FOREIGN PATENT DOCUMENTS

| 6-349010 | 12/1994 | (JP) | G11B/5/09 |
|---|---|---|---|
| 2603500 | 1/1997 | (JP) | G11B/5/09 |

OTHER PUBLICATIONS

IBM Technical Disclosure Bulletin, "Adaptive Magnetic Write Width Control", vol. 35, Issue No. 6. Nov. 1992.*

* cited by examiner

Primary Examiner—W. Chris Kim
(74) Attorney, Agent, or Firm—Limbach & Limbach L.L.P.

(57) ABSTRACT

In a data recording system used for a magnetic disk drive, a write amplifier feeds a write head with a recording current that corresponds to the data to be recorded on the disk. A recording current controller selects a current value to be fed to the write head from the write amplifier according to the recording pattern detected by a pattern detection circuit. Thus, an effective recording track width can be selected without relying on the recording wavelength of the data to be recorded. Therefore, the influence of the cross talk from adjacently located tracks can be effectively reduced without unnecessarily reducing the recording track width.

6 Claims, 11 Drawing Sheets

FIG. 16A
CLOCK

MAGNETIC RECORDING CONTROL SYSTEM FOR DISK STORAGE DRIVE

BACKGROUND OF THE INVENTION

This invention generally relates to a magnetic disk drive such as a hard disk drive and, more particularly, it relates to a magnetic recording control system applicable to a magnetic disk drive adapted to realize a high track density and hence a high recording density.

To date, magnetic disk drives such as hard disk drives are popularly used as storage devices in computer systems. The remarkable increase in the processing capacity of computers in recent years has given rise to a strong demand for large capacity HDDs that can cope with the current computer scene where application software is required to provide sophisticated processing capabilities and the volume of data to be processed by a computer is enormously increasing.

The capacity of an HDD can be increased in two ways. Firstly, it can be increased by raising the number of disks and/or the disk diameter that can be dealt with by an HDD. As the number of disks increases, the rotary drive force of the spindle motor for driving the disks should be raised. Then, there arises the problem of increased power consumption rate of the HDD and that of heat and noise generated within the HDD. On the other hand, disks having a large diameter require the use of a large disk drive. Thus, while this method may be feasible for the storage devices of main frame computers, it is not for compact and large capacity HDDs to be used for small computers such as personal computers.

Secondly, the capacity of an HDD can be increased by raising the recording density per disk. The recording density of a disk can be raised by raising the linear recording density and/or the track density. The track density is increased in turn by reducing the track width and the track pitch. The track density refers to the number of tracks per inch as viewed in a radial direction of the disk.

In the case of small HDDs, efforts have been paid to improve the performance of the magnetic head (to be referred to simply as head hereinafter) of HDD for reading/writing data and develop low noise disks in an attempt for improving the recording density. The performance of the head can be improved by reducing the flying height of the head relative to the disk and the gap between the write head and the read head. Additionally, the performance of the head can also be improved by making the upper and lower magnet poles of uniform width to effectively suppress the phenomenon of side writing.

In recent years, composite heads realized by combining a read head and a write head and mounting them on a common slider are in the main stream. A composite head typically comprises an inductive head as write head, although it is conventionally used as read/write head, and a magnetoresistive (MR) head as read head. An MR head is a head that is highly responsive to the existence of a magnetic flux and has an advantage of providing a read back output that is very large if compared with an inductive head and not dependent on the relative velocity of the head and the disk. Giant MRs (GMRS) showing an improved read back relative to MRs are currently under development. As for the write head, research and development efforts are being paid to realize write heads by using a magnet pole material that can generate a high saturated magnetic flux density and a strong recording magnetic field if compared with a conventional core material.

The read head (MR head) and the write head of a composite head can be designed independently. Therefore, it is possible to select an optimal value for the ratio of the effective read back track width, or the width of the read head, to the width of the data track (the effective recording track to be defined by the recording operation of the write head). As described above, the track density can be increased by reducing the track width and the track pitch. However, this technique can raise the rate of appearance of cross talk from adjacently located tracks so that the read head is preferably made narrower than the write head in order to narrow the read back sensitivity distribution across the track. On the other hand, read heads having a width less than 1 $\mu$m can be manufactured only by using sophisticated head manufacturing technologies. Particularly, in the case of manufacturing MR heads, complex thin film processes have to be used to minimize the degradation of the magnetic characteristics in the course of forming MR film and improve the dimensional accuracy of the electrodes and hence the read back output.

Generally, in the process of manufacturing heads adapted to a narrow track, a large process tolerance will have to be allowed relative to the track width to consequently lower the yield. In other words, it is currently very difficult to reduce the recording track width in order to improve the track density, while maintaining the ratio of the recording track width (the width of the write head) to the read back track width (the width of the read head), particularly in the case of an MR head that is used as read head.

In view of these circumstances, there is an attempt to allow a relatively high level of cross talk from adjacently located tracks and compensate the negative effect of the high cross talk level by processing signals in a sophisticated manner. This technique normally involves the use of a complicated signal processing algorithm that may require a large volume of hardware and large cost if realized in the form of electronic circuits. Additionally, it cannot completely eliminate the negative effect of a high cross talk level of a magnetic recording system that involves a large number of nonlinear factors. Thus, this technique is not feasible, at least currently, from the viewpoint of cost/performance.

The key for realizing narrow tracks arranged at a small pitch lies in to what extent the cross talk can be suppressed in a magnetic recording system using a write head and a read head having only small widths and to what level the cross talk can be allowed to occur within the system. Particularly, in a system where the read back tracks have a width smaller than 1 $\mu$m, the recording track width, the read back track width and the track pitch have to be determined by carefully taking the cross talk from adjacently located tracks into consideration.

Meanwhile, currently available HDDs show a phenomenon that the recording track width changes as a function of the wavelength to be used for recording data. In other words, the longer the wavelength, the greater the recording track width. HDDs are required to meet the performance-related requirements at the smallest track width. In order to design an HDD that operates satisfactorily at the smallest track width, it is highly important to understand to what extent the cross talk from adjacently located tracks affects the data being reproduced as interference noise.

A cross talk is most influential when the longest recording wavelength is found on adjacently located tracks. Therefore, the recording track width, the read back track width and the track pitch have to be so selected as to confine the cross talk level within a permissible range for the system. Then, any data tracks where data are recorded beyond the limited width can baffle the attempt of minimizing the track pitch.

As discussed above, it is difficult with any conventional HDD technologies to meet the requirement of reducing the track pitch and realizing a track width less than 1 μm because of the adverse effect of the cross talk from adjacently located tracks given rise to by fluctuations in the recording track width.

BRIEF SUMMARY OF THE INVENTION

Therefore, it is the object of the present invention to provide a high track density disk drive that can realize a small track pitch by reducing the adverse effect of the cross talk from adjacently located tracks given rise to by fluctuations in the recording track width without unnecessarily reducing the recording track width and the read back track width.

According to the invention, the above object is achieved by providing a magnetic recording control system for a magnetic disk drive comprising a write head for magnetically recording data on a disk as a function of a recording current to produce a data track, a means for feeding the head with the recording current as a function of the data to be recorded and a control means for controlling the intensity of the recording current so as to select a track width for the data track.

Thus, it is possible for a magnetic recording control system for a magnetic disk drive according to the invention to maintain the effective width of a data track produced by recording data to a substantially constant value without relying on the recording wavelength being used for recording data. In other words, the effective recording track width can be held to a predetermined value by controlling the intensity of the recording current being used for recording data. Thus, it is possible to suppress the level of the cross talk from adjacently located tracks for which long wavelength components are responsible. Consequently, it is possible to reduce the effective recording track width and the track pitch and increase the track density.

When keeping the recording track width substantially to a constant value by modifying the recording current as a function of the recording pattern, it may be reasonably assumed that the recording distortion that is referred to as transition shift can be increased in a magnetic recording operation conducted on a disk by means of a magnetic recording control system according to the invention if compared with a conventional recording system using a fixed current value. Thus, according to another aspect of the invention, there is provided a magnetic recording control system for a magnetic disk drive comprising a means for regulating the recording current as a function of the recording pattern and a means for regulating the compensation for the recording distortion referred to as pre-compensation. The means for regulating the compensation for the recording distortion suppresses the nonlinear transition shift by modifying the compensation for the recording distortion as a function of the recording pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Now, the present invention will be described by referring to the accompanying drawing that illustrates preferred embodiments of the invention.

(1st Embodiment)

Generally, for recording signals on a magnetic recording medium such as a disk, the area of the medium that can affect the recording layer is divided into a region where signal components detected from the recording tracks by a head can be utilized as read back signals and a region located outside that region and adapted to be used as erasable region. For the purpose of the present invention, the width of the former region is defined as effective recording track width while that of the latter region is defined as erasable width. While their values may change depending not only on the recording wavelength and the recording current but also on the material of the write head, the gap length and the flying height of the write head. However, it is assumed for this embodiment that all the parameters other than the recording wavelength and the recording current are predetermined.

Figure 1:
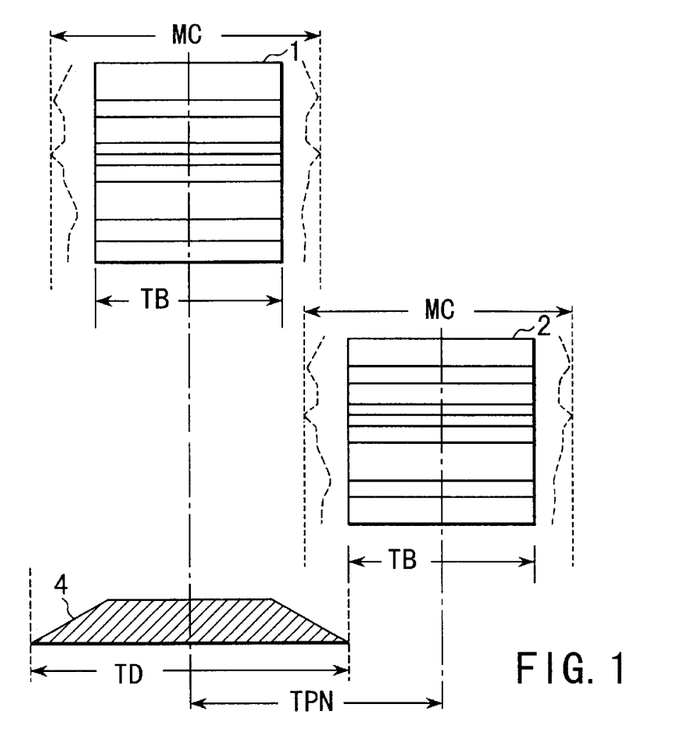
FIGS. 1 and 2 schematically illustrate the positional relationship of adjacently located tracks on a disc and the relationship of the effective recording track width, the effective read back track width and the attainable limit of magnetization that relate to the first embodiment of the invention.
Figure 2:
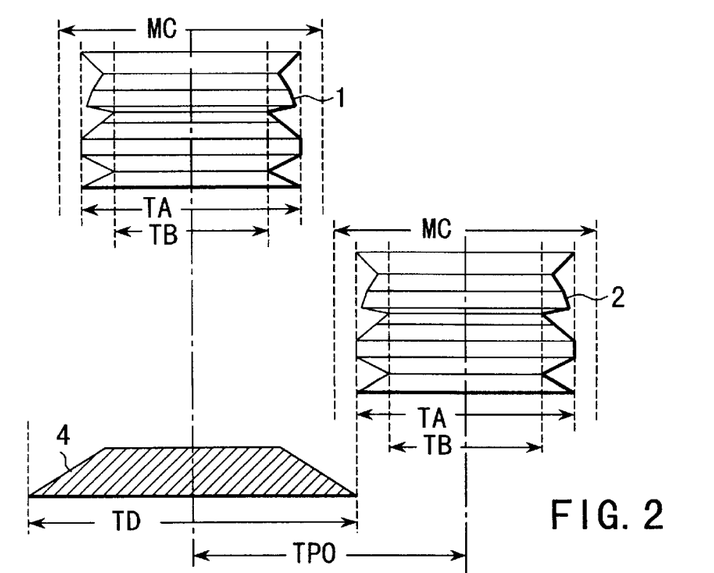

Firstly, the ratio of the read back track width to the recording track width for realizing a minimal track pitch by means of the conventional technology will be discussed. FIGS. 1 and 2 schematically illustrate the positional relationship of adjacently located data tracks (recording tracks), or track 1 and track 2, on a disc for realizing a minimal track pitch.

If the recording track widths for a maximal recording wavelength TA and the read back track width for a minimal recording wavelength is TB provided that the recording current is predetermined and if the sum of the effective recording track width and the erasable width or the attainable limit of the magnetic field of the head as viewed transversally relative to the track that can affect the recording layer of the magnetic disk (to be referred to as attainable limit of the magnetic field) is MC, then the attainable limit of the magnetic field MC does not depend on the recording wavelength and shows a constant width when the recording current is constant. The method of observing the effective recording track width will be discussed in detail hereinafter.

With the recording method of FIG. 2, the effective recording track width TX varies within a range of TB≦TX≦TA depending on the recording wavelength. Since the track pitch is so selected that the data to be reproduced from a recording track may not be erased by the adjacently located tracks, the smallest track pitch TPO is defined by equation (1) below.

$$TPO=(TA+MC)/2 \qquad (1)$$

With the first embodiment of the invention, on the other hand, the recording current is controlled according to the recording pattern in order to maintain the effective recording track width to a constant value regardless of the recording wavelength. If the effective recording track width is so controlled as to take the value of TB for the shortest recording wavelength, the smallest track pitch TPN is expressed by equation (2) below.

$$TPN=(TB+MC)/2 \qquad (2)$$

Thus, with this embodiment, the track pitch can be reduced from the value obtainable by the conventional technology by "TPO−TPN=(TA−TB)/2".

Meanwhile, with the trend of ever increasing recording density of HDDs, the head is required to have a width as small as 1 μm as viewed transversally relative to the track, although it is difficult for read heads to be adapted to narrow tracks mainly because of the restrictions relating to the manufacturing process. The width of a write head as viewed transversally relative to the track is referred to the read back track width. Thus, while the recording track width can be reduced relatively easily, it is difficult to reduce the read back track width so that the ratio of the recording track width to the read back track width tends to become smaller. Then, as a result, currently the HDD is highly sensitive to the cross talk from adjacently located tracks and, therefore, the track pitch has to be defined in terms of cross talk. The method of observing the cross talk will be discussed hereinafter.

Now, the ratio of the recording track width to the read back track width of the embodiment having a value different from a conventional recording medium will be discussed below.

Referring to FIGS. 1 and 2, the effective read back track width that confines the cross talk from adjacently located tracks within a permissible range is denoted by TD. Note that adjacent tracks have to be so arranged that the read head may not sense the signals recorded on the adjacent tracks as unnecessary signals beyond a permissible level by means of its magnetization detecting ability. Then, the smallest track pitch as shown in FIG. 2 is expressed by equation (3) below.

$$TPO=(TA+TD)/2 \qquad (3)$$

On the other hand, the smallest track pitch as shown in FIG. 1 is expressed by equation (4) below.

$$TPN=(TA+TD)/2 \qquad (4)$$

Thus, in this case again, the embodiment can reduce the track pitch from the value obtainable by the conventional technology by "TPO−TPN=(TA−TB)/2".

While all the tracks of the embodiment have the width defined by the shortest recording wavelength in the above description, they may not necessarily have a same width. It is possible to make each of the tracks have an appropriately selected width if the on-track performance is secured for it and the recording current is controlled as a function of the recording wavelength.

In such a case, if the largest track width is TE, the track pitch can be reduced by "(TA−TE)/2". Note that such an arrangement is within the scope of this embodiment.

Figure 3:
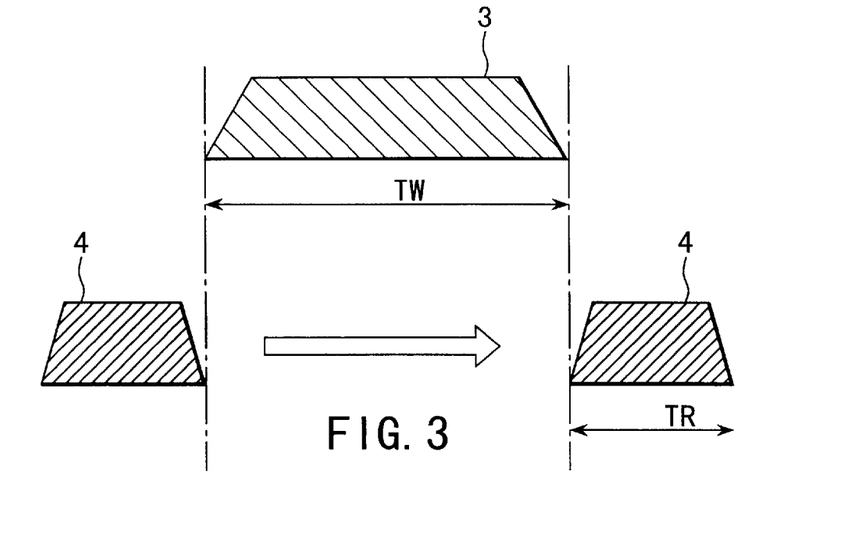
FIG. 3 schematically illustrates the method of measuring the effective recording track width for the first embodiment of the invention.
Figure 4:
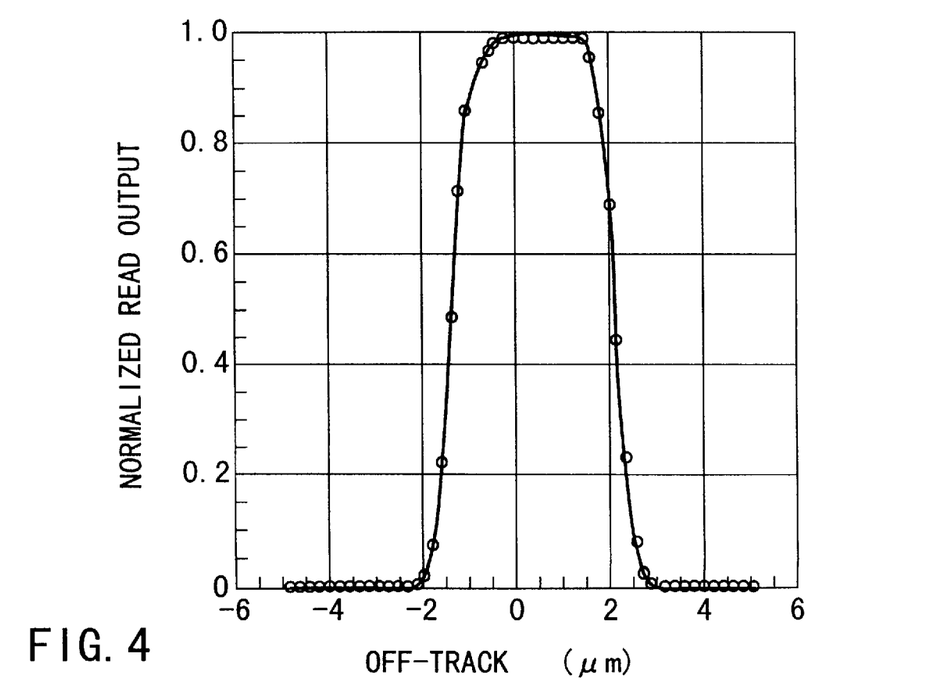
FIG. 4 is a graph showing the off-track profile obtained by observing the effective recording track width for the first embodiment of the invention.

Now, the method of observing the effective recording track width will be discussed. FIG. 3 schematically illustrates the method of measuring the effective recording track width for the first embodiment of the invention. FIG. 4 is a graph showing the off-track profile obtained by the method.

Firstly, a repetitive pattern will be recorded by means of a write head 3, using only a predetermined recording current and a predetermined recording wavelength. The off-track profile of FIG. 4 is obtained by observing the change in the read back output produced when read head 4 is driven off the track at a pitch less than 1/10 of the pitch of arrangement of the write head 3 or the read head 4, whichever having the narrower optical width (the read head 4 in the case of FIG. 4) of the two.

Referring to FIG. 3, if the relationship between the recording track width TW and the read back track width TR is "TW>TR", the effective recording track width is expressed by the full-width at half maximum obtained when the off-track profile is normalized by the read back output. Then, the off-track profile is observed by means of a magnetic recorder/reproducer comprising magnetic heads and a magnetic disc, using different combinations of recording current and recording wavelength, and the effective recording track width is obtained from the values of full-width at half maximum for the respective combinations.

Figure 5:
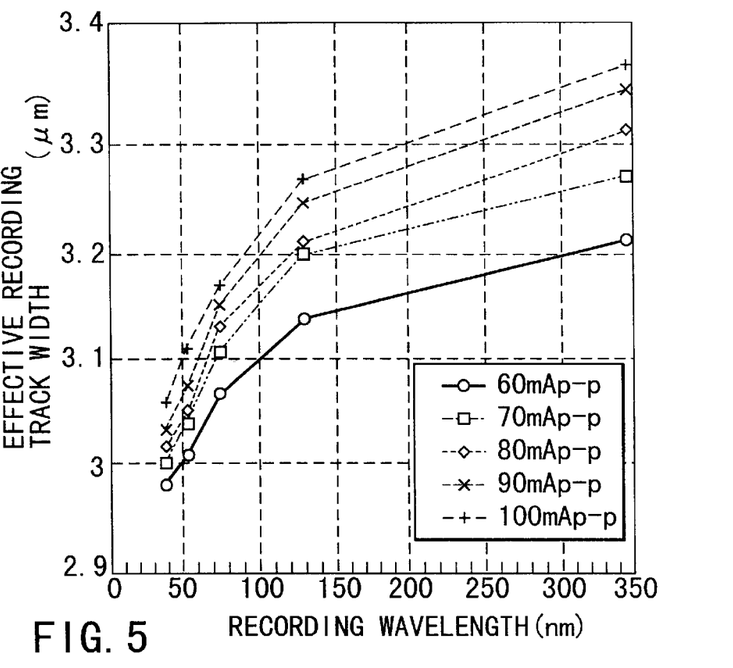
FIG. 5 is a graph showing the recording current dependency of the relationship of the recording wavelength and the effective recording track width.

As described above, the effective recording track width of this embodiment is held to a constant value without depending on the recording wavelength by controlling the recording current as a function of the recording wavelength. FIG. 5 is a graph showing the recording current dependency of the relationship of the recording wavelength and the effective recording track width. It will be seen from FIG. 5 that the effective recording track width is increased as the recording wavelength increases for each recording current and that effective recording track width is increased as the recording current rises. The increment or the decrement of the effective recording track width due to the change in the recording wavelength and/or the recording current does not depend on the recording track width per se.

Figure 6:
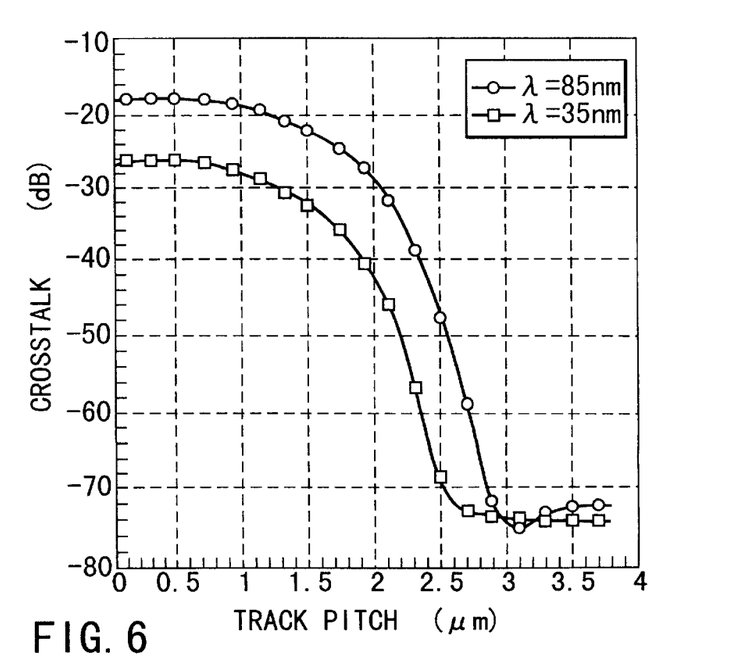
FIG. 6 is a graph showing the recording current dependency of the relationship between the track pitch and the cross talk from adjacently located tracks.

On the other hand, the cross talk profile of adjacently located tracks can be obtained by using the off-track profile of FIG. 4. FIG. 6 is a graph showing the recording current dependency of the relationship between the track pitch and the cross talk from adjacently located tracks that is obtained from the off-track profile of FIG. 4. It will be seen from FIG. 6 that the cross talk increases as the track pitch is reduced and it also increases as the recording wavelength is increased if the track pitch is held constant.

Now, the track pitch that can be theoretically obtained when the effective recording track widths for all the recording wavelengths to be used by controlling the recording current are made equal to the effective recording track width for the smallest recording wavelength will be described by comparing it with the track pitch that can be theoretically obtained with a constant recording current by means of the conventional technology.

Firstly, the procedure of designing the recording track width, the read back track width and the track pitch will be described.

(1) When the recording track width is specified in advance, the read back track width and the track pitch will be selected by following the procedure as described below.

"Step 1": The track pitch is determined in such a way that the data on the recording track to be read may not be erased by the operation of writing data on an adjacent track.

"Step 2": The read back track width is determined in such a way that the cross talk may not exceed the permissible level.

(2) When the track pitch is specified in advance, the recording track width and the read back track width will be selected by following the procedure shown below.

"Step 1": The recording track width is determined in such a way that the data on the recording track to be read may not be erased by the operation of writing data on an adjacent track.

"Step 2": The read back track width is determined in such a way that the cross talk may not exceed the permissible level.

(3) When the read back track width is specified in advance, the recording track width and the track pitch will be selected by following the procedure as described below.

"Step 1": The track pitch is determined in such a way that the cross talk may not exceed the permissible level.

"Step 2": The recording track width is determined in such a way that the data on the recording track to be read may not be erased by the operation of writing data on an adjacent track.

In actual applications, values greater than those obtained by the above procedure may be used for the recording track width and the track pitch respectively.

(HDD Configuration)

Figure 7A:
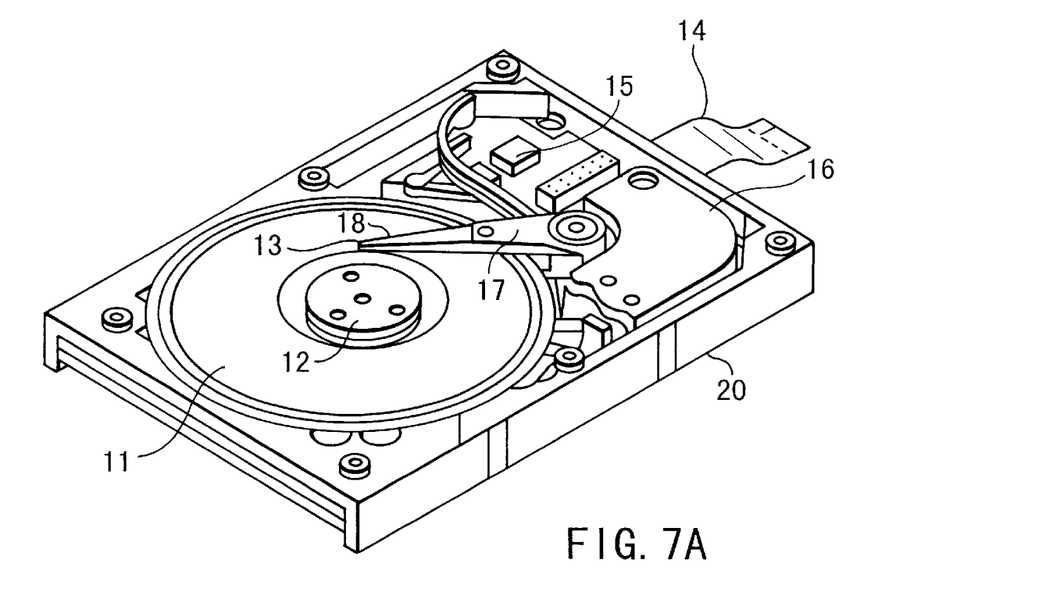
FIGS. 7A and 7B are schematic perspective views of an HDD that can be used for the first embodiment of the invention.
Figure 7B:
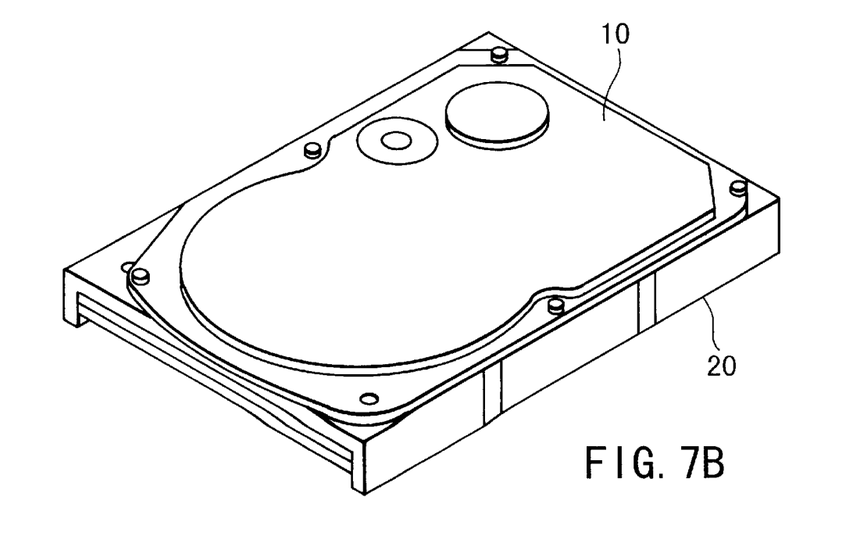

FIGS. 7A and 7B are schematic perspective views of an HDD that can be used for the first embodiment of the invention.

FIG. 7A is a view of the HDD with the top cover 10. FIG. 7B is a view with the top cover 10. In the HDD, the disk 11 is driven to rotate by a spindle motor 12 in order to record data on the disk 11 or reproduce the data recorded on the disk 11 by means of a composite head 13.

In a data recording operation, an electric signal representing the data to recorded is fed from an external controller (not shown) to head amplifier 15 contained in the cabinet 20 of the HDD by way of a flexible cable 14 and subjected to current amplification. Then, a recording current is fed from the head amplifier 15 to the write head of the composite head 13 by way of a flexible cable (not shown) arranged in actuator arm 17 and head suspension 18 and a head lead wire to record the data on the disk 11.

For reproducing data, the electric signal reproduced from the disk 11 by means of the read head of the composite head 13 is fed to the head amplifier 15 reversely relative to the recording current, where the signal is amplified. Then, the signal is taken out of the cabinet 20 by way of the flexible cable 14 and fed to an external controller (not shown).

The composite head 13 is placed in position on the disk 11 in a controlled manner as the arm 17 is driven by a voice coil motor 16. The head carries out a data reading/writing operation at the right position (track position). For the positioning control operation, the servo data stored on the disk 11 is reproduced by the read head of the composite head 13. The controller (CPU) of the HDD controls the feedback operation necessary for placing the head 13 on the right track position by referring to the reproduced servo data.

(Recording/Read Back System)

The recording/read back system of the first embodiment of the invention will be described by referring to the block diagram of FIG. 8.

Firstly, as for the recording system, the data 101 to be recorded on the disk 11 is fed from host system 21. The data 101 to be recorded is then fed to a randomizer 23 by way of a pretreatment circuit 22, where it is subjected to an unbiasing process referred to as randomization. This is a process of eliminating any bias in the operation of reproducing and decoding the data stored on the disk 11 by means of the read head of the composite head 13 attributable to the decoding characteristics of the head.

The data that has been subjected to an unbiasing process by the randomizer 23 is then encoded by encoder 24 and transformed into a data 102 to be recorded comprising a code string reflecting the transmission line characteristics of the recording/read back system. The data 102 to be recorded is then put into a distortion compensator 25 and transformed into a data 103 to be recorded that is adapted to compensate the nonlinearity of the recording operation attributable to the synergetic effect of the characteristics of the magnetic material of the recording layer of the magnetic disk 11 and those of the write head.

The obtained data 103 to be recorded is then sent to a write current controller 26 and a write amplifier 28 comprising a voltage/current conversion amplifier housed in head amplifier 27, where it is converted into a recording current pattern. Then, the data 103 is fed to the write head that may typically be a ring-type induction head arranged in the magnetic head 13 and saturation-recorded on the magnetic disk 11 as magnetized data.

Note that the effective recording track width is held to a constant value regardless of the recording wavelength by controlling the recording current for the recording current pattern output from the write amplifier 28 as a function of the recording pattern 103 by means of the write current controller 26, which will be described hereinafter. Additionally, a synchronous signal 104 and a track width-recording current conversion signal 105 are fed from the host system 21 to the write current controller 26.

As for read back system, the data saturation-recorded on the disk 11 as magnetized data is reproduced as electric signal by means of the read head of the composite head 13, which read head may be an MR head or a GMR head. The reproduced signal is then amplified by the read amplifier 29 in the head amplifier 27 and any fluctuations in the oscillation amplitude of the signal given rise to by the fluctuations in the rotary motion of the spindle motor 12, those in the flying height of the head 13 and/or those in the recording radius/position are absorbed by automatic gain control (AGC) amplifier 30 to show a predetermined amplitude.

Then, the waveform of the signal is shaped by equalizer 31 showing adequate equalizing characteristics selected to conform to the transmission line characteristics.

The reproduced and equalized signal produced by the equalizer 31 is then fed to sample hold circuit 32, which holds a sample in synchronism with the channel clock generated by clock generator 34. In this embodiment, the output signal of the sample hold circuit 32 is equalized by means of an error absorbing type equalizer such as adaptive equalizer 33 in order to improve the accuracy of waveform shaping and then reversely transformed by decoder 35 into a data that is identical with the data prior to the encoding operation. While various decoders 35 that can be used for the embodiment may be known, including those adapted to process digital signals, a decoder adapted to process analog signals is used here. The output of the decoder 35 is subjected to a post-treatment operation such as synchronization in a disposition circuit 36 and then fed to the host system 21 as reproduced data 107.

Now, the configuration of the write current controller 26 will be described by referring to FIGS. 9 through 11.

Figure 8:
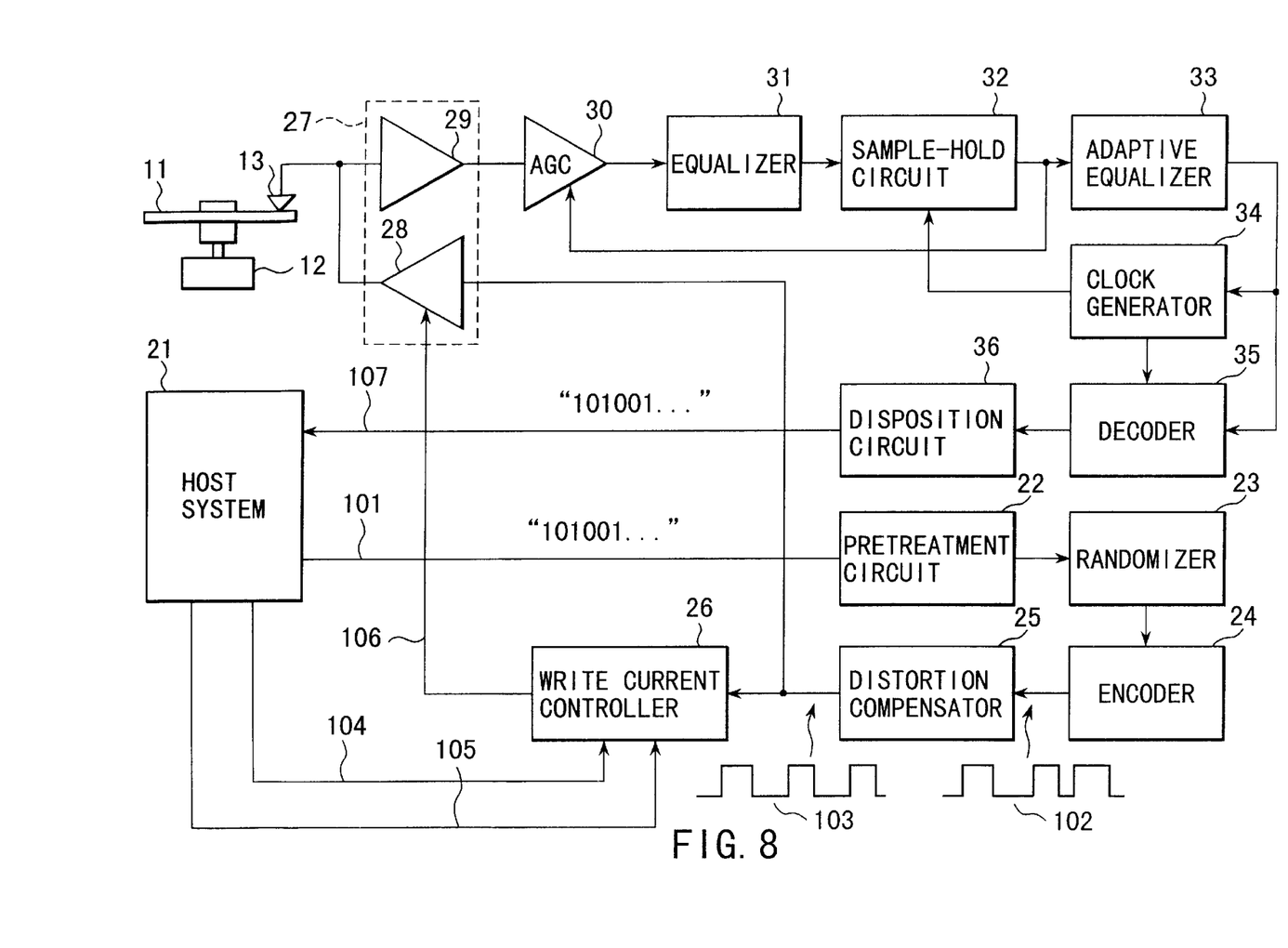
FIG. 8 is a schematic block diagram of the recording/read back system of the first embodiment of the invention.
Figure 9:
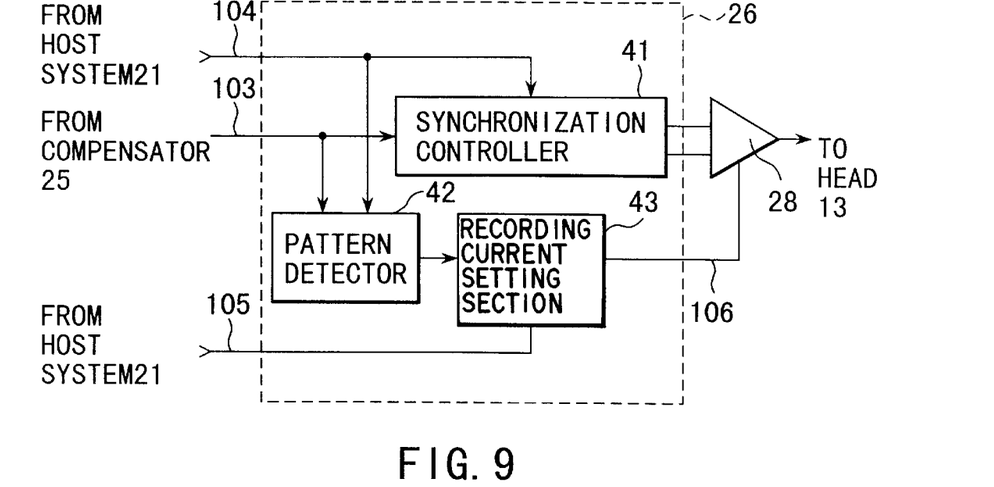
FIG. 9 is a schematic block diagram of the recording current controller of the first embodiment of the invention.

As shown in FIG. 9, the write current controller 26 comprises a synchronization controller 41, a pattern detector 42 and a recording current setting section 43. The synchronization controller 41 supplies the recording pattern 103 from the distortion compensator 25 shown in FIG. 8 to the write amplifier 28 in synchronism with the synchronous signal 104 transmitted from the host system 21. The pattern detector 42 detects the recording pattern 103 in synchronism with the synchronous signal 104 and the recording current setting section 43 selects an appropriate recording current according to the outcome of the detecting operation and the track width-recording current conversion signal 105.

More specifically, in the write current controller 26, the recording current setting section 43 selects one of the recording current values predetermined in correspondence with the respective individual patterns of the recording pattern 103 on the basis of the dependency of the effective recording track width on the recording current for different recording wavelengths of the recording pattern 103 in such a way that the effective recording track width is held to a constant value for all the recording pattern 103 regardless of the recording wavelength and transmits a recording current control signal 106 that corresponds to the selected recording current value to the write amplifier 28.

Normally, for the operation of processing a signal in a magnetic recorder/reproducer, the signal reproducing operation and the signal recording operation are conducted in a coordinated manner in order to minimize decoding errors. In other words, the recorder/reproducer is designed to carry out a signal recording operation that is adapted to carry out a signal reproducing operation in the most effective way. In the recording operation, the data 102 to be recorded is transformed into an appropriate recording pattern 103 by means of the distortion compensator 25 as described earlier. The recording pattern 103 is typically an NRZ-I (non-return to zero inverse) sequence and the pattern detector 42 is adapted to detect the number of consecutive "1s" in the NRZ-I sequence or the interval of magnetization reversal for recording/magnetization. Note, however, that the type of the recording pattern 103 is determined in advance according to the selected signal processing system so that the configuration of the pattern detector 42 may be modified to make it adapted to the selected signal processing system within the scope of the embodiment.

Figure 10:
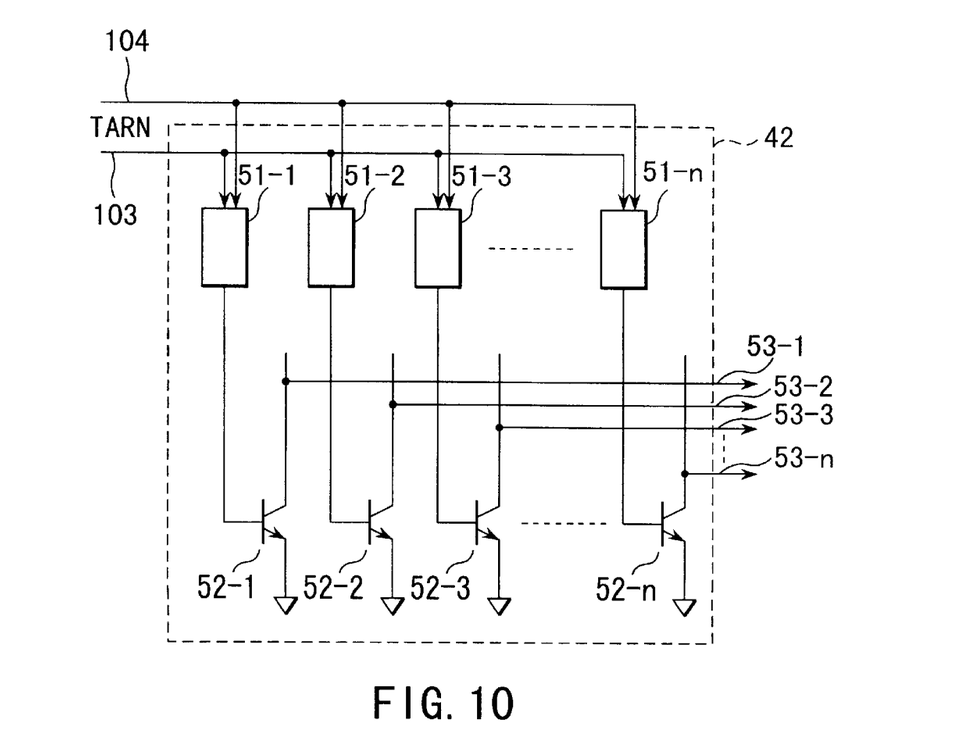
FIG. 10 is a schematic circuit diagram of the pattern detector of the first embodiment of the invention.
Figure 11:
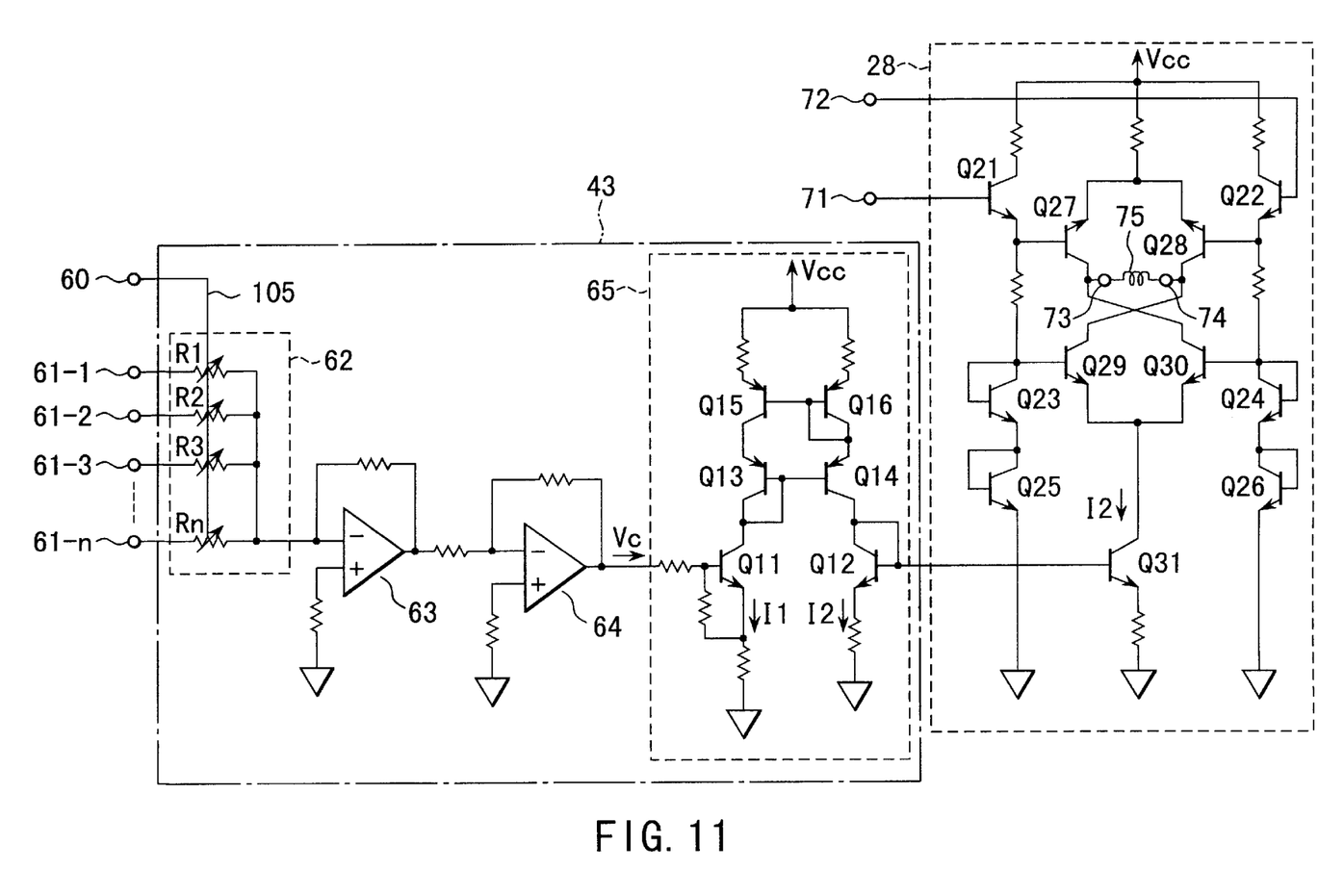
FIG. 11 is a schematic circuit diagram of the write amplifier and the recording current selector of the first embodiment of the invention.

The circuit configuration of the pattern detector 42 will be described by referring to FIG. 10 showing a circuit diagram of the pattern detector 42.

As discussed above, the recording pattern 103 is typically an NRZ-I sequence in the form of a string of bit stream such as " . . . 1001110000" that is input to the pattern detector 42. The pattern detector 42 then detects the number of consecutive "1s" (contiguity length) of the recording pattern 103 by means of contiguity length detectors 51-1, 51-2, . . . , 51-n. More specifically, the contiguity length detector 51-1 generates a detection output signal (e.g., an H-level signal) when the number of consecutive "1s" of the recording pattern 103 is "1" and the contiguity length detector 51-2 generates a detection output signal when the number of consecutive "1s" is "2" and so on. The contiguity length detector 51-n generates a detection output signal when the number of consecutive "1s" is equal to "n".

In the case of an NRZ-I sequence, magnetization reversal is transferred onto the magnetic disk 11 for each transition from "0" to "1" or vice versa and, therefore, the interval of magnetization reversal can be detected by the contiguity length detectors 51-1, 51-2, . . . , 51-n. The interval of magnetization reversal corresponds to the recorded bit length on the magnetic disk 11, which is equal to #/2 when the recorded bit length is equal to #.

The output signals of the contiguity length detectors 51-1, 51-2, . . . , 51-n are fed respectively to the bases of corresponding transistors 52-1, 52-2, . . . , 52-n, whose emitters are connected to a constant potential (e.g. the ground potential). Therefore, when any of the contiguity length detectors 51-1, 51-2, . . . , 51-n generates an H-level signal, the corresponding one of the transistors 52-1, 52-2, . . . , 52-n is turned on. The outputs of the collectors of the transistors 52-1, 52-2, . . . , 52-n are fed to the recording current setting section 43 shown in FIG. 9.

Now, the recording current setting section 43 and the write amplifier 28 will be described in detail by referring to the circuit diagram of FIG. 11.

The input terminals 61-1, 61-2, . . . , 61-n of the recording current setting section 43 are connected respectively to the collector outputs 53-1, 53-2, . . . , 53-n of the corresponding transistors 52-1, 52-2, . . . , 52-n shown in FIG. 10. The input terminals 61-1, 61-2, corresponding terminals of variable resistors R1, R2, terminals of the variable resistors R1, R2, . . . , Rn are commonly connected to a common contact, which operates as the output terminal of the current adder 62.

The variable resistors R1, R2, . . . , Rn have respective resistances r1, r2, . . . , rn, that are weighted by values corresponding to the consecutive numbers of "1s" to be detected respectively by the contiguity length detectors 51-1, 51-2, . . . , 51-n shown in FIG. 10. The resistances show a relationship of r1<r2< . . . <rn. In other words, the resistances r1, r2, relatively large consecutive number of "1s" has a resistance greater than a resistor for a relatively small consecutive number of "1s". More specifically, the resistances of the resistors are inversely proportional to the consecutive numbers of "1s".

Thus, when the number of consecutive "1s" of the recording pattern 102 is large, a relatively small electric current is output from the output terminal of the current adder 62. For instance, referring to FIG. 10, when the number of consecutive "1s" is equal to "2", the transistor 52-3 is turned on by the detection output signal of the contiguity length detector 51-2 and, as an electric current is made to flow to the variable resistor R2 by way of the transistor 52-2, the output terminal of the current adder 62 produces an electric current that is inversely proportional to the resistance r2 of the variable resistor R2.

Additionally, the resistances r1, r2, . . . , rn of the variable resistors R1, R2, . . . , Rn can be regulated by means of a track width-recording current conversion signal 105 fed from the host system 21 to the control input terminal 60 shown in FIG. 8. The significance of this arrangement will be discussed hereinafter.

The output current of the current adder 62 is transformed into a voltage signal Vc by means of current-voltage converters/amplifiers 63, 64, which voltage signal is then fed to current mirror circuit 65 as bias voltage. The current mirror circuit 65 comprises transistors Q11 through Q16 and several resistors and is configured in a known manner. An input current I1 corresponding to the bias signal Vc is fed to the input side transistor Q11 and an output current I2 that corresponds to the current I1 is fed to the output side transistor Q12.

The output terminal of the current mirror circuit 65 is connected to the write amplifier 28. The write amplifier 28 feeds the input terminals 71, 72 with a recording pattern signal that is a differential signal in synchronism with synchronous signal 104 from the synchronization controller 41 in FIG. 9 and amplifies the current in order to feed the write head of the magnetic head 13 with a recording current. The write amplifier 28 comprises transistors Q21 through Q31 as principal components. The recording pattern signal applied to the input terminals 71, 72 is forwarded to a differential amplifier circuit comprising transistors Q27 through Q31 by way of an input circuit comprising transistors Q21, Q22 and diode-connected transistors Q23 through Q26 and amplified by the differential amplifier circuit in order to feed a recording current to write coil 75 connected between output terminals 73, 74 that are emitters of transistors Q27, Q28.

The recording current flowing to the write coil 75 is determined by the bias current supplied to the differential amplifier circuit, which is current I2 flowing through constant current source Q31 connected to the common emitter of the transistors Q29, Q30. The current I2 is equal to the output current I2 of the current mirror circuit 65 described earlier. As described earlier, the output current I2 of the current mirror circuit 65 corresponds to the output current of the current adder 62 that is inversely proportional to the number of consecutive "1s" of the recording pattern 1-3 detected by the contiguity length detectors 51-1, 51-2, . . . , 51-n so that consequently, the larger the number of consecutive "1s" or the longer the recording wavelength, the smaller the recording current. Conversely, the shorter the recording wavelength, the greater the recording current.

Thus, the effective recording track width can be held to a constant value regardless of the recording wavelength by means of the above described arrangement.

While this embodiment is designed to keep the effective recording track width to a constant value regardless of the recording wavelength by controlling the recording current according to the recording pattern in a manner as described above, the relationship between the effective recording track width and the recording current can vary depending on various conditions. Therefore, with the above embodiment, the resistances of the variable resistors R1 through R2, or the weights to be used for the current adder 62, are regulated by means of a track width-recording current conversion signal 105 so as to make the recording current value that corresponds to a predetermined recording pattern (predetermined number of consecutive "1s") agree with the effective recording track width. This regulating operation can be performed by maintaining a table of different relations of the track width and the recording current in the host system 21 and updating the table regularly at the time of shipment from the manufacturing plant or that of the use of a self test feature.

With the above arrangement, the effective recording track width can be held to a value desired by the user regardless of the recording wavelength.

(2nd Embodiment)

Figure 12:
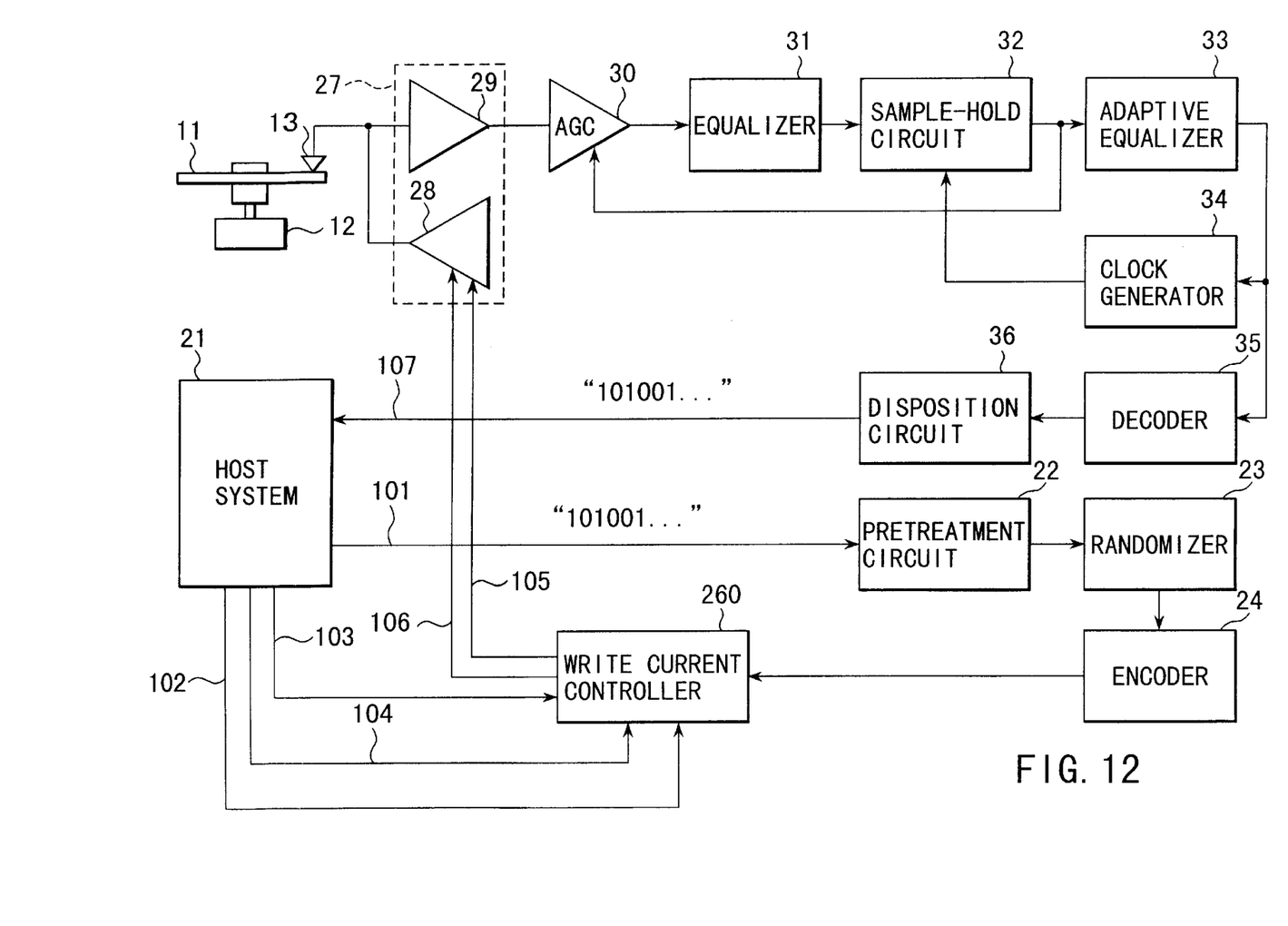
FIG. 12 is a schematic block diagram of the recording/read back system of a second embodiment of the invention.

FIG. 12 is a schematic block diagram of the recording/read back system of a second embodiment of the invention.

With the above described first embodiment, the effective recording track width held to a constant value regardless of the recording wavelength by regulating the recording current according to the recording pattern. On the other hand, the second embodiment is so designed that the effective recording track width is held to a constant value by regulating the recording current and, at the same time, the recording distortion compensation according to the recording pattern. More specifically, when keeping the recording track width substantially to a constant value by modifying the recording current as a function of the recording pattern, it may be reasonably assumed that the recording distortion that is referred to as transition shift can be increased in a magnetic recording operation conducted on a disk by means of a magnetic recording control system according to the invention if compared with a conventional recording system using a fixed current value. Thus, in this embodiment, there is provided a magnetic recording control system for a magnetic disk drive comprising a means for regulating the recording current as a function of the recording pattern and a means for regulating the compensation for the recording distortion referred to as pre-compensation.

Now, the second embodiment will be described in detail by referring to FIGS. 12 and 13. The components that are same as or similar to those of the first embodiment are denoted respectively by the same reference symbols and will not be described any further.

As shown in FIG. 12, this embodiment is featured by a recording current-distortion compensation controller 260 (hereinafter referred to simply as controller). The controller 260 operates to control the recording current of the recording current pattern output from the write amplifier 28 according to the recording pattern 101 of the data to be recorded that is sent from the host system 21. Thus, the effective recording track width is held to a constant value regardless of the recording wavelength. The controller 260 has an additional function of compensating the distortion of the data to be recorded at the same time, with which function the recording pattern is transformed into a recording pattern adapted to the nonlinearity attributable to the synergetic effect of the characteristics of the magnetic material of the recording layer of the disk 11 and those of the write head. Thus, not only the ordinary nonlinear distortion of recording (transition shift) but also the nonlinear distortion of recording generated by the above described control of the recording current can be compensated. As described hereinafter, the controller 260 is fed with a pattern compensation value converting signal 102 from the host system 21, a track width-recording current conversion signal 105 and a synchronous signal 104. On the other hand, the controller 260 feeds the write amplifier 28 of the head amplifier 27 with a distortion compensation control signal 105 and a recording current control signal 106.

The recording system of the second embodiment other than the controller 260 is identical with that of the first embodiment. More specifically, the data 101 to be recorded on the disk 11 is fed from the host system 21. The data 101 to be recorded is then fed to the randomizer 23 by way of the pretreatment circuit 22, where it is subjected to an unbiasing process referred to as randomization. This is a process of eliminating any bias in the operation of reproducing and decoding the data stored on the disk 11 by means of the head 13 attributable to the decoding characteristics of the head.

The data that has been subjected to an unbiasing process by the randomizer 23 is then encoded by encoder 24 and transformed into a data 102 to be recorded comprising a code string reflecting the transmission line characteristics of the recording/read back system. The data to be recorded corresponds to the recording pattern to be actually recorded on the disk 11. The data to be recorded is then put into the write amplifier 28 comprising a voltage/current conversion amplifier by way of said controller 260, where it is converted into a current pattern to be recorded. Then, the recording current pattern to be recorded is fed to the write head that may typically be a ring-type induction head arranged in the magnetic head 13 and saturation-recorded on the magnetic disk 11 as magnetized data. The read back system of this embodiment is identical with that of the first embodiment and hence will not be described here any further.

(Configuration of the Controller 260)

Now, the configuration and the operation of the controller 260 will be described by referring to FIGS. 13 and 16.

Figure 13:
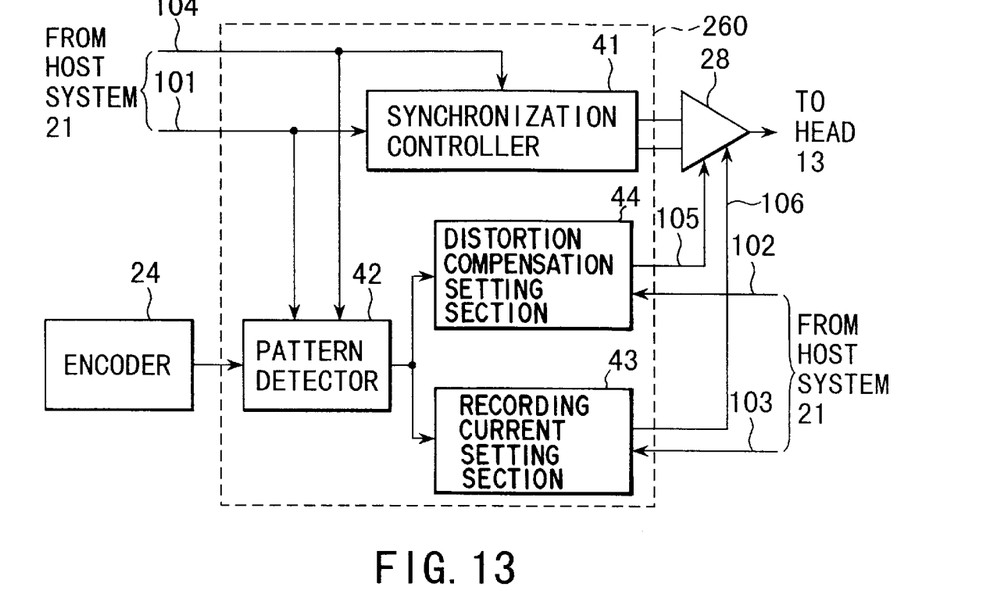
FIG. 13 is a schematic block diagram of the recording current controller of the second embodiment of the invention.

As shown in FIG. 13, the controller 260 comprises a synchronization controller 41, a pattern detector 42, a recording current setting section 43 and a distortion compensation value selector 44. The synchronization controller 41 forwards the recording pattern 101 from the encoder 24 of FIG. 12 to the write amplifier 28 in synchronism with the synchronous signal 104 from the host system 21. The pattern detector 42 detects the recording pattern in synchronism with the synchronous signal 104.

The recording current setting section 43 selects an appropriate recording current value that corresponds to the outcome of the pattern detecting operation of the pattern detector 42 by means of the track width-recording current conversion signal 103 from the host system 21 and feeds the write amplifier 28 with a recording current control signal 106. Meanwhile, the distortion compensation setting section 44 carries out a nonlinear distortion compensating operation that corresponds to the outcome of the pattern detecting operation of the pattern detector 42 by means of the pattern-compensation value conversion signal 102 from the host system 21 and feeds the write amplifier 28 with a distortion compensation control signal 105.

More specifically, the recording current setting section 43 selects a recording current value so as to maintain the effective recording track width to a constant value for all the recording pattern according to the dependency of the effective recording track width on the recording current value in terms of the recording wavelength of the recording pattern. In other words, it selects a recording current value from a set of predetermined values that corresponds to each of the recording patterns and feeds the write amplifier 28 with a recording current control signal 106 that corresponds to the selected recording current value.

On the other hand, the distortion compensation setting section 44 compensates the recording pattern by means of a compensation value selected out of a set of predetermined values according to the dependency of the nonlinear transition shift on the recording current value in terms of the recording wavelength of the recording pattern and feed the write amplifier 28 with a distortion compensation control signal 105 corresponding to the compensated recording pattern signal.

(Modified Embodiments)

Figure 14:
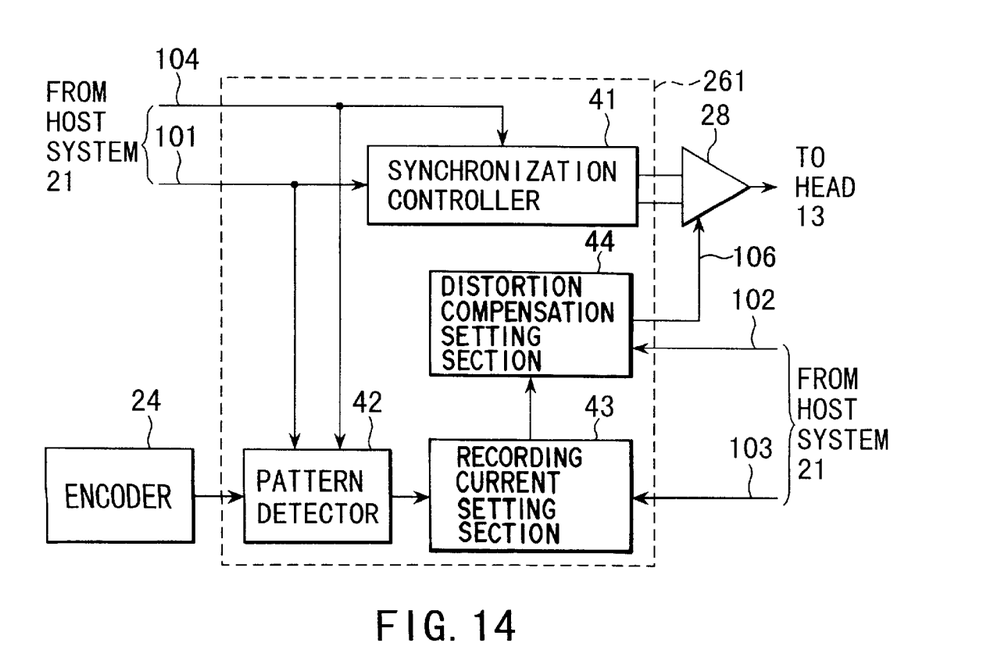
FIG. 14 is a schematic block diagram of an embodiment obtained by modifying the second embodiment.
Figure 15:
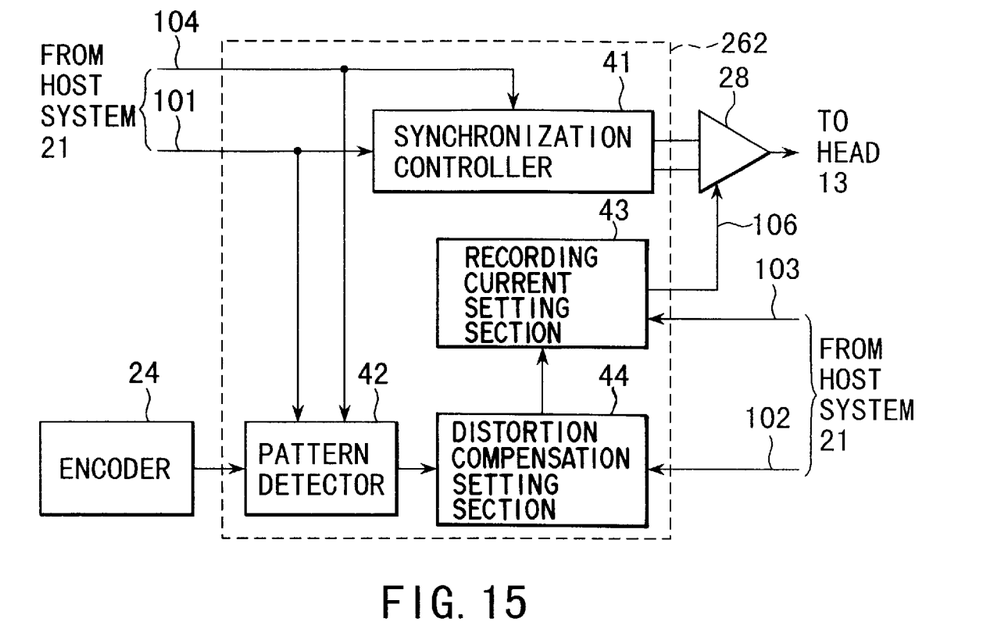
FIG. 15 is a schematic block diagram of another embodiment obtained by modifying the second embodiment.

FIGS. 14 and 15 are schematic block diagrams of other embodiments obtained by modifying the second embodiment.

As described above by referring to FIG. 13, the second embodiment comprises a recording current setting section 43 and a distortion compensation setting section 44 arranged in parallel down stream relative to the pattern detector 42.

However, as shown in FIG. 14, the effect of the second embodiment may be obtained by arranging the recording current setting section 43 downstream relative to the pattern detector 42 and the distortion compensation setting section 44 downstream relative to the recording current setting section 43. Similarly, the effect of the second embodiment may also be obtained by arranging the distortion compensation setting section 44 downstream relative to the pattern detector 42 and the recording current setting section 43 downstream relative to the distortion compensation setting section 44.

With any of the above arrangements, the effective recording track width can be held to a desired constant value regardless of the recording wavelength and, at the same time, the nonlinear distortion that can appear as a result of a change in the recording current can also be suppressed effectively. The relationship between the nonlinear distortion and the recording current changes as a function of various conditions like the relationship between the effective recording track width and the recording current. Normally, the nonlinear distortion increases as the recording current increase. Therefore, the operation of regulating the nonlinear distortion can be performed by maintaining a table of different relations of the track width and the recording current in the host system 21 and updating the table regularly at the time of shipment from the manufacturing plant or that of the use of a self test feature.

Finally, the effect of suppressing the nonlinear distortion (transition point shift) of the embodiments will be described by referring FIGS. 16A through 16G.

Figure 16A:
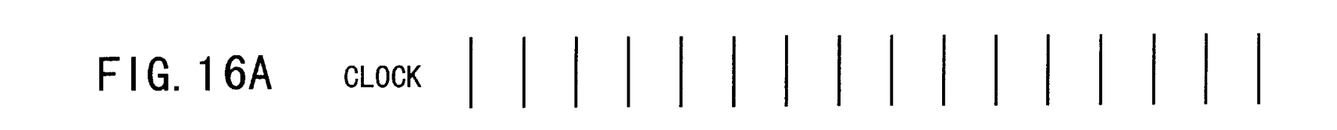
FIGS. 16A through 16G illustrate the compensation for a nonlinear distortion of the second embodiment of the invention.
Figure 16B:
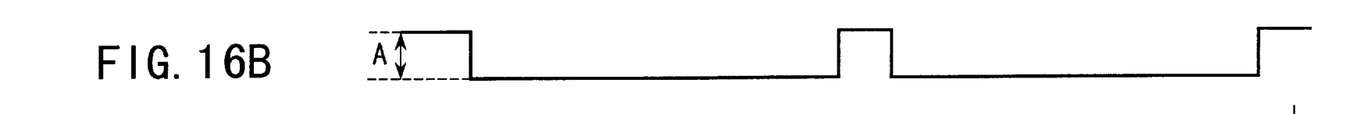
Figure 16C:
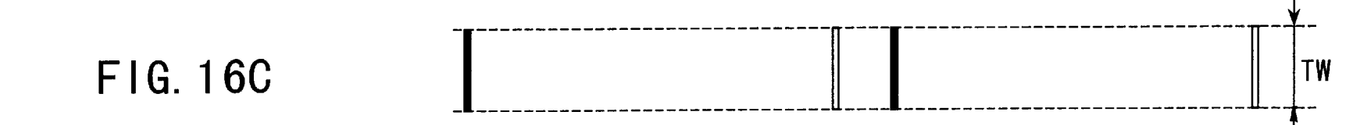
Figure 16D:
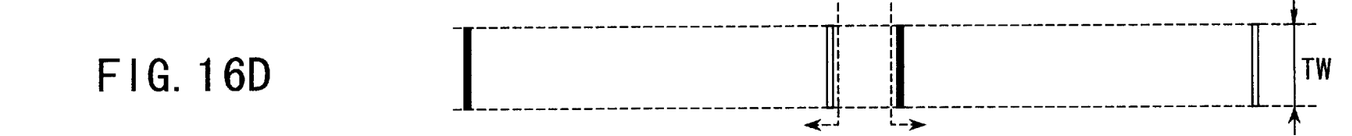

FIG. 16A shows a reference clock that can be used for writing data. FIG. 16B shows a recording current pattern defined by a fixed current value A. FIG. 16C shows an ideal recording condition for recording data (effective recording track width TW). In reality, however, a transition shift (ordinary nonlinear distortion as indicated by arrows) occurs according to the recording pattern and, therefore, it is a common practice to carry out a write compensation process (part of the functional feature of the pretreatment circuit 22).

Figures 16E, 16F:
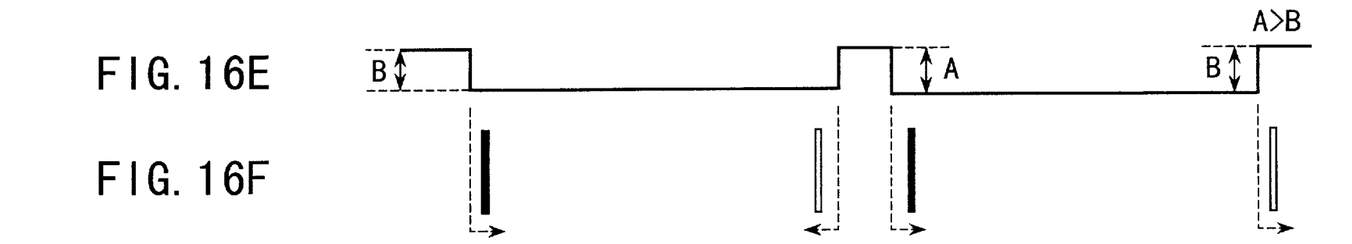
Figure 16G:
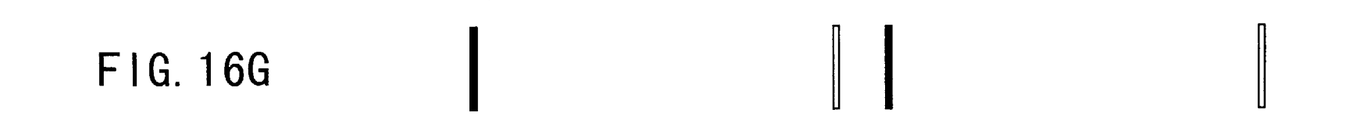

Contrary to that, as shown in FIG. 16E, the first embodiment is adapted to change the recording current as a function of the recording pattern (specifically current value A and current value B). Then, as shown in FIG. 16F, it may be reasonably assumed that a transition shift can occur. Thus, as described above, the second embodiment is designed to suppress the transition shift (nonlinear distortion) in the write condition on the disk as shown in FIG. 16G by arranging a distortion compensation setting section 44 for selecting a distortion compensation value according to the recording pattern and a recording current setting section 43.

As described above in detail, according to the invention, firstly the effective recording track width on the magnetic recording medium can be held substantially to a constant value regardless of the recording wavelength (recording bit length) by controlling the recording current as a function of the recording pattern in such a way that the recording current is increased when the recording wavelength is short. Thus, according to the invention, the degree of interference by long recording wavelength components that give rise to a cross talk to a large extent from adjacently located tracks can be remarkably reduced and, at the same time, the effective recording track width per se can be reduced. As a result, the effective recording track width can be controlled and the track pitch can be reduced without degrading the performance of the magnetic disc drive even if it is difficult to obtain a desired read back track width for reasons arising from the manufacturing process. Thus, the present invention makes it possible to realize a high recording density and a large recording capacity that cannot be desirable by conventional technologies.

Secondly, when varying the recording current as a function of the recording pattern in order to achieve the above effect, it is reasonable assumed that a nonlinear distortion can occur accordingly. According to the invention, such a nonlinear distortion can be effectively suppressed to provide a magnetic recording system showing a high recording density and an enhanced reliability.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording control system for a magnetic disk drive comprising:

write head for magnetically recording data on a disk, thereby forming a data track, said data corresponding to a recording current;

means for feeding said head with recording current corresponding to the data to be recorded; and control means for controlling intensity of the recording current to select a width for said data track, wherein said control means controls said recording current as a function of the recording pattern of said data to be recorded.

2. A magnetic recording control system for a magnetic disk drive, comprising:

a write head for magnetically recording data on a disk, thereby forming a data track, said data corresponding to a recording current;

means for feeding said head with recording current corresponding to the data to be recorded;

control means for controlling intensity of the recording current to select a width for said data track; and pattern detection means for detecting the recording pattern of the data to be recorded on said disk;

said control means being adapted to select a value for said recording current as a function of the recording pattern detected by said pattern detection means.

3. A system according to claim 2, wherein said pattern detection means detects the number of consecutive significant values of said recording pattern; and said control means selects a recording current in such a way that the smaller the number of consecutive significant values, the larger the recording current.

4. A magnetic recording control system for a magnetic disk drive comprising:

a write head for magnetically recording data on a disk corresponding to a recording current to produce a data track;

means for feeding said head with the recording current as a function of the data to be recorded;

means for detecting the recording pattern of the data to be recorded on said disk;

means for selecting a current value for said recording current as a function of the recording pattern detected by said detection means; and control means for determining the recording distortion compensation value as a function of said recording pattern and selecting it for said feeding means.

5. A system according to claim 4, wherein said control means is adapted to determine the recording distortion compensation value in accordance with the current value of said recording current selected by said selecting means.

6. A system according to claim 4, wherein said control means determines the recording distortion compensation value in accordance with said recording pattern and selects a current value for said recording current as a function of the recording distortion compensation value.

* * * * *